United States Patent [19]
Satzinger

[11] 3,961,805
[45] June 8, 1976

[54] SAFETY SYSTEM FOR THE OCCUPANTS OF VEHICLES, ESPECIALLY MOTOR VEHICLES

[76] Inventor: Roland Satzinger, Hammelburger Str. 21 a, D-8731 Euerdorf, Germany

[22] Filed: Mar. 13, 1975

[21] Appl. No.: 558,105

[30] Foreign Application Priority Data
Apr. 4, 1974  Germany............................ 2416313

[52] U.S. Cl................................ 280/747; 280/751; 296/65 A; 297/216
[51] Int. Cl.².......................................... B60R 21/10
[58] Field of Search................... 280/150 SB, 150 B; 296/65 A, 65 R; 297/385, 388, 389, 216

[56] References Cited
UNITED STATES PATENTS

| | | | |
|---|---|---|---|
| 3,586,373 | 6/1971 | Reidelbach | 297/389 |
| 3,829,122 | 8/1974 | Bastide | 280/150 B |
| 3,856,351 | 12/1974 | Garvey | 280/150 SB |
| 3,881,744 | 5/1975 | Tupper | 280/150 B |

*Primary Examiner*—Robert R. Song
*Attorney, Agent, or Firm*—Burgess, Dinklage & Sprung

[57] ABSTRACT

An improvement in a safety system for a motor vehicle equipped with a driver's seat comprising a seating surface hingedly connected to a back rest which improvement comprises at least one energy absorbing damper connected to the driver's seat to absorb forces which would tend to move said driver's seat forward and to stop said forward movement, a lap belt disposable over an occupant of the seat, said lap belt connected at each end thereof to said seat, a shoulder belt connected to said seat at one end thereof and to said vehicle at the other end thereof and disposable diagonally across the body of a seat occupant.

6 Claims, 4 Drawing Figures

… … …

SAFETY SYSTEM FOR THE OCCUPANTS OF VEHICLES, ESPECIALLY MOTOR VEHICLES

BACKGROUND OF THE INVENTION

This invention relates to a safety system for the occupants of a motor vehicle, especially a car. More particularly, this invention relates to an improved safety system for assuring protection simultaneously of passengers in a front seat and passengers in the rear seats. This invention is particularly concerned with providing an energy absorbing system to restrain impingement of a front seat occupant against a motor vehicle, while at the same time providing a protection for passengers rearly disposed seat in respect of their needs. This invention is especially concerned with energy absorbing dampers anchored to the seat and to the backrest.

DISCUSSION OF THE PRIOR ART

A variety of safety systems have been proposed heretofore. These rely upon an energy absorbing movement of the front seat and backrest. The front seat and backrest, however, have to be adjusted differently according to how the vehicle is occupied. Otherwise some assurance must be provided that rear seat occupants also use seat belts. This is owing to the fact that if the front seat is stationery, the rear seat occupants must be stationarily held to the rear seat for when the vehicle stops shortly, the occupants of the rearward seats will be thrust forward against the front seat with ensuing damage. In most instances the front seat remains stationary upon collision.

Problems which have thus far required solutions include the creation of a safety system in which energy absorbing dampers are attached to the seat and to the backrest which provides satisfactory energy absorption and restraint for the front seat occupants alone or for the front seat occupants together with the rear seat occupants. It has been desirable to provide such a safety system without changing the setting of the energy absorbing restraining force.

SUMMARY OF THE INVENTION

The long-felt desideratum in the art is solved in accordance with the present invention which provides an improvement in a motor vehicle equipped with a driver's seat comprising a seating surface hingedly connected to a backrest and in a general facing relationship to a steering wheel, the improvement comprising at least one energy absorbing damper connected to the driver's seat to absorb forces which would tend to move said driver's seat forward and to stop said forward movement, a lap belt disposable over an occupant of the seat, the lap belt being connected at each end thereof to said seat, a shoulder belt connected to said seat at one end thereof and to said vehicle at the other end thereof and disposable diagonally across the body of a seat occupant.

The summary type description given above for the safety system of the present invention is described in relationship to a driver's seat. Of course, the system could be employed in a motor vehicle in connection with a passenger seat only, such as a passenger seat disposed adjacent the driver's seat. Problems heretofore encountered in safety systems are solved by the present invention, which utilizes at least one belt for the restraint of the occupant, this belt being disposed over the lap of a seat occupant from one hip area to the other. Both ends of the lap belt are connected to the seat. A shoulder belt is also employed of the type which runs diagonally over an occupants body such as by being disposed over one shoulder and extending across the body in a downward fashion to be connected in the hip area with a lap belt and a belt receiving means. The other end of the shoulder belt is connected to the vehicle body, preferably with means for limiting movement of the belt such as will occur during collision. Disposed on the back of the back rest there is a rearwardly facing restraining cushion, preferably adjustable upward and downwardly and lengthwise of the vehicle in relation to the backrest.

The purpose of the restraining cushion on the backrest is to protect passengers seated in rearward seats. It is known that if such passengers are not wearing seatbelts and the vehicle is caused to abruptly stop or enter a collision, the passengers will be thrown forward owing to the momentum of the vehicle. This forward thrust usually causes the knees of the passenger to move forward and upwardly while the shoulders move forward and downwardly. By disposing a restraining cushion against the back of the back cushion the rearwardly disposed passengers are thrust against this cushion which absorbs the forces of the collision, thereby protecting the body of the rear passenger.

The front seat is guided in a seat guide and is mounted in an energy absorbing manner to an energy absorbing damper. The energy absorbing damper dissipates energy as the front seat travels forward upon collision. The front seat is moved forward owing to the momentum but the energy damping system restrains substantial amount of that energy from being converted into kinetic energy, whereby the passenger of the front seat would collide with the dashboard. The seat moves forward while the damping system absorbs a substantial percentage of the forces created, thereby precluding the passenger from becoming impinged against the dashboard. This restraint is also effected by use of the shoulder belts, or the portions of such belts which extend over the shoulder, inasmuch as such belts are fastened at the lower end to the seat and anchored at the upper end to the car body, preferably with a restraining force limiting means.

The energy absorbing damper is preferably, in connection with a front seat, a spring biased track connected to the front seat which allows the seat to move forward somewhat with the resistance of the springs, but only to such an extent that no injury will be caused by the passenger smashing against the dashboard. This energy-absorbing damper or track is generally disposed along the bottom of the car and is disposed generally alongside of and rearwardly of the front seat although a portion can protrude, if desired, in front of the front seat.

The back rest is also supported in an energy dissipating manner, and, according to another feature of the invention, is equipped with the restraining cushion. Obviously if the automobile is not equipped with a rearward seat no restraining cushion need be employed. This restraining cushion is disposed above the upper surface of the rear seat cushion, preferably so as to be adjustable upwardly and downwardly and lengthwise of the vehicle in relation to the backrest.

If there are rearward seats in the motor vehicle these rearward seats are also preferably connected to a separate and distinct energy absorbing damper means. In such instance the rearward seats are connected to a damping system in the form of a spring biased rod or shaft member protruding from the seat in the forward direction. This energy absorbing damper restrains movement of the back seat forward and serves to absorb all of the forces which might be created at the back seat during a collision.

By the described safety system it is unnecessary for rear seat occupants to "buckle up" inasmuch as the front seat backrest with its restraining cushions serves to protect rear seat occupants should they be thrust forward. Additionally, since the front seat is moveably connected to its energy damping system, the front seat will move forward during a collision, thereby providing more room between the rearward seat and the backrest. Of course, the rear passengers can still not impinge against the backrest owing to the additional presence of the restraining cushion attached to the backrest. By providing an assembly wherein a portion of the front seat moves, additional room is provided for the knee protection of the passengers on a rear seat.

The front seat occupants are fastened to the seat in the abdominal area by the belt, and can enter an energy dissipating, shock-absorbing movement with the seat. The shoulder portion of a lap and shoulder belt of one piece construction, or a separate shoulder belt, as the case may be, is fastened at one end to the seat, at the other end to the vehicle body with restraining force limiting means. Thus, the front seat occupants are also restrained at the upper part of their bodies.

The rear seat and backrest need a large volume of space for the protection of the rear seat occupants, especially when such occupants can be thrown forward during a collision. The front seat occupant has the advantage in a collision that he remains seated on the seat and the lap belt does not become loose due to stretch or elongation of the belt and any restraining force limiting means. The occupant is thus held much more securely in the event that the car should overturn.

The shoulder belt is fastened to the seat, and passes through a shoulder belt guide on the back rest or restraining cushion, which is intended to assure correct belt application. Lastly, it is anchored to the vehicle body, preferably with a restraining force limiting means. For better fit, a belt roller can be used.

Since in the event of a collision the slack of the belt of the front seat occupant is not equal to the distance between the rear seat occupant and the restraining cushion on the back of the backrest of the front seat, it is essential that these systems operate independently of one another.

In the case of the invention it is of no significance, for example, that the front seat may commence its forward motion somewhat earlier than the energy-dissipating function is performed in respect of or for the benefit of the rearward passengers. The seat belt guide to be fastened to the backrest can be built into the backrest or into the restraining cushion. Thus the anchoring point of the shoulder belt can be located in a slightly different direction.

DESCRIPTION OF THE DRAWINGS

In order to understand and appreciate the safety system of the present invention, reference is made to the accompanying drawings in which.

DESCRIPTION OF SPECIFIC EMBODIMENTS

Figure 1:
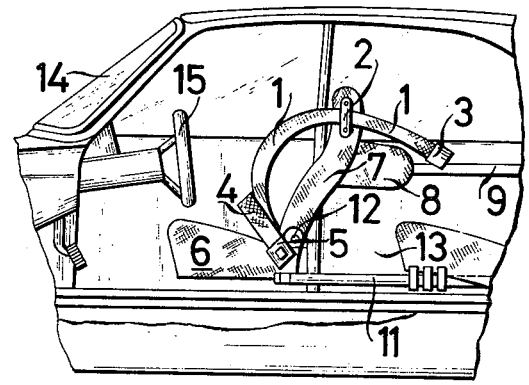
FIG. 1 represents a side elevation view of a vehicle equipped with the safety device looking from one side door. The side of the motor vehicle is removed.

Referring to the drawings there is shown in FIG. 1 front seats 6 which are adjoined by links 12 to their respective backrests 7. Disposed on the back of the backrests and protruding rearwardly are restraining cushions 8. The seating surface 6 is held in an energy dissipating manner by the dampers 11 and guided in the seat guide. The dampers 11 protrude rearwardly of the seating portion of the front seats 6 and are held securely at the rearward end thereof to the vehicle. The seats can move during a collision but only to the extent that the dampers 11 will allow their movement. These dampers absorb the energy during a collision.

The lap belt 4 is fastened to seat 6 through lap belt anchoring point 5 and the belt lock portions 10. The shoulder belt 1 is held to seat 6 by the belt lock portions 10 and to the body at the limited restraining force fastening point 3 and is guided by the belt guide 2 which provides for correct belt application. The energy absorbing mounting means provided by dampers 9 of backrest 7 with restraining cushion 8 is designed only for the damping of the mass of the person seated in the rear seat 13. The steering wheel 15 and the windshield 14 are also depicted in the drawings.

Figure 2:
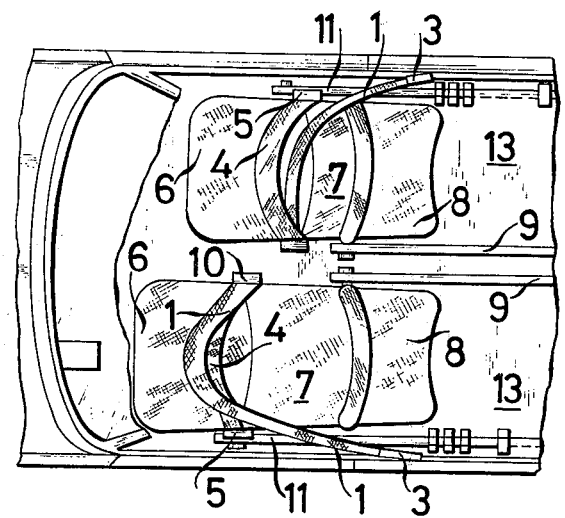
FIG. 2 is a top-plan view of the front seat after a collision, in which only the driver's seat was occupied.
Figure 3:
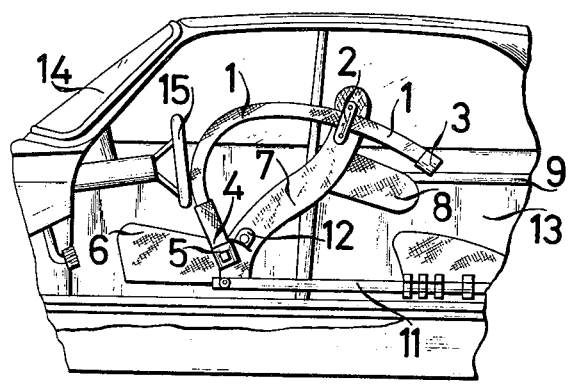
FIG. 3 is an elevational view into the vehicle from one door side corresponding to FIG. 2.

In FIGS. 2 and 3 the driver's seat 6 is represented after a collision. These figures show that the seat 6, restrained by the damper 11, performs an energy absorbing movement and that shoulder belt 1 has also elongated or extended, while the back rest 7 at the top and the restraining cushion 8 have remained in the original position.

Figure 4:
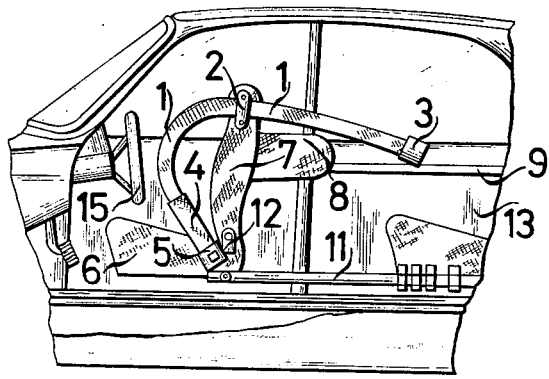
FIG. 4 is an elevational view into the vehicle from one door side after a collision in which the front seat and rear seat were occupied.

FIG. 4 shows the front seat 6 with the back rest 7 and the restraining cushion 8 after a collision in which the front seats 6 and the rear seats 13 were occupied. The person in the front seat has been subjected to an energy absorbing, shock absorbing movement with seat 6, held by belts 4 and 1. The rear seat passengers were restrained by the back rest 7 with restraining cushion 8.

In all, the following advantages are achieved by a system of this kind pursuant to the invention:

1. The front seat occupant is restrained in an energy absorbing manner at all points, and different restraining forces can be exerted on the lap belt 4 and shoulder belt 1.

2. The front seat occupant is subjected with seat 6 to a shock absorbing movement whereby the lap belt 4 does not become loose, which is important especially with regard to overturning.

3. By the forward movement of seat 6 and back rest 7, a shock absorbing path is created for the knees, legs, shanks, pelvis and abdomen of the rear seat occupants.

4. The energy dissipating mounting of the front seat back rest 7 is designed to restrain the rear seat passengers and is operative also in the case of differences in belt tightness and in the distance between the rear seat occupants and the restraining cushion 8, and the resultant delay of the onset of the shock damping action.

5. The vehicle can be occupied in any desired manner without having to increase or decrease the energy absorbing action.

6. By the belt guide 2 an identical belt application is accomplished at any position of the seat, and a favorable anchoring point can be selected.

What is claimed is:

1. In a motor vehicle equipped with a front seat comprising a seating surface hingedly connected to a backrest, said motor vehicle equipped with a safety system which comprises at least one energy absorbing damper connected to said driver's seat to absorb forces which would tend to move said driver's seat forward and to stop said forward movement, a lap belt disposable over an occupant of the seat, said lap belt connected at each end thereof to said seat, a shoulder belt connected to said seat at one end thereof and to said vehicle at the other end thereof and disposable diagonally across the body of a seat occupant, said energy absorbing system comprising a first energy absorbing damper which is connected to the seating surface which longitudinally guides said front seat and a second energy absorbing damper, independent of the first energy absorbing damper, said second energy absorbing damper connected to said backrest to longitudinally guide the same, said backrest having connected thereto a rearwardly disposed restraining cushion.

2. A safety system according to claim 1, wherein there is at least one passenger seat disposed in said motor vehicle rearwardly of said front seat.

3. A safety system according to claim 1, wherein said restraining cushion is adjustable in height.

4. A safety system according to claim 3, wherein said restraining cushion is additionally adjustable lengthwise.

5. A safety system according to claim 1, wherein said shoulder belt is guided in a belt guide disposed on said backrest.

6. A safety system according to claim 1, wherein said shoulder belt is guided in a belt guide disposed on said restraining cushion.

* * * * *